(12) United States Patent
Hsu

(10) Patent No.: US 9,140,288 B2
(45) Date of Patent: Sep. 22, 2015

(54) PIPELINE FASTENER

(71) Applicant: Hung-I Hsu, Kaohsiung (TW)

(72) Inventor: Hung-I Hsu, Kaohsiung (TW)

( * ) Notice: Subject to any disclaimer, the term of this patent is extended or adjusted under 35 U.S.C. 154(b) by 93 days.

(21) Appl. No.: 14/150,943

(22) Filed: Jan. 9, 2014

(65) Prior Publication Data

US 2015/0192164 A1    Jul. 9, 2015

(51) Int. Cl.
*F16B 35/00*    (2006.01)
*F16B 35/04*    (2006.01)

(52) U.S. Cl.
CPC ...................................... *F16B 35/04* (2013.01)

(58) Field of Classification Search
CPC ...... F16B 25/00; F16B 25/103; F16B 31/025; F16B 33/02; F16B 35/04; F16B 35/041; F16B 35/007
USPC .................. 411/381–382, 395, 411, 422, 424
See application file for complete search history.

(56) References Cited

U.S. PATENT DOCUMENTS

| | | | | |
|---|---|---|---|---|
| 126,366 | A | * | 4/1872 | Wills .......................... 411/387.4 |
| 2,053,864 | A | * | 9/1936 | Cook et al. ...................... 16/274 |
| 3,886,707 | A | * | 6/1975 | Heldt ............................ 411/14.5 |
| 5,709,356 | A | * | 1/1998 | Avenet et al. ................. 244/1 A |
| 6,811,365 | B2 | * | 11/2004 | Monson ........................ 411/395 |
| 2005/0008444 | A1 | * | 1/2005 | Bertani .............................. 411/2 |

* cited by examiner

*Primary Examiner* — Roberta Delisle
(74) *Attorney, Agent, or Firm* — Rosenberg, Klein & Lee

(57) ABSTRACT

A pipeline fastener defines at least one hole formed on a hollow shank with a channel formed therein and has a chip-removing section at least formed between the hole and the channel of the shank. A diameter of the chip-removing section is bigger than a bore diameter of the hole. Accordingly, by the chip-removing section with the bigger diameter, burrs which are originally formed at a convergence between a bore surface of the hole and a periphery of the shank can be removed. Consequently, following burr-cleaning procedures are reduced to lower the production cost, and damages of the burrs to other objects at the time of using the pipeline fastener are further prevented, thereby improving the safety of the use efficiently.

6 Claims, 6 Drawing Sheets

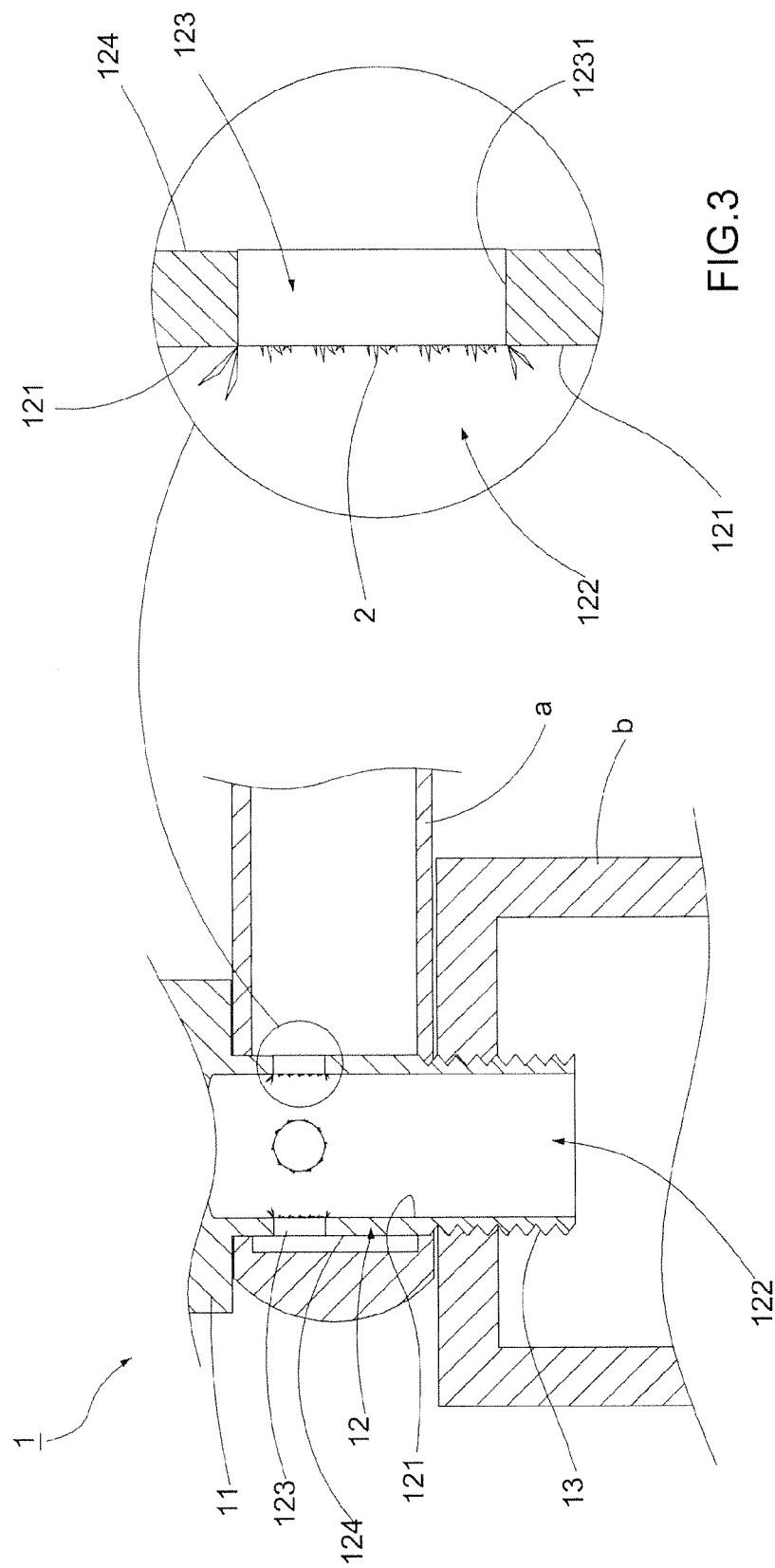

PIPELINE FASTENER

BACKGROUND OF THE INVENTION

1. Field of the Invention

The present invention pertains to a fastener, in particular to a pipeline fastener.

2. Description of the Related Art

An ordinary pipeline fastener is usually applied to fasten and connect two pipes. By means of the pipeline fastener, the two pipes can be communicated with each other, whereby the pipeline fastener is usually used in a hydraulic brake system of vehicles, such as a joint for connecting a brake fluid container with a brake fluid pipe. Consequently, the pipeline fastener is widely applied to varied fields.

Referring to FIG. 1 and FIG. 2, a conventional pipeline fastener 1 comprises a head 11, a shank 12 connected to the head 11, and a plurality of threads 13 spirally disposed on the shank 12. Wherein, a channel 122 is enclosed by an inner wall 121 defined inside the shank 12. One end of the channel 122 opposite to the head 11 is communicated with an outside. At least one hole 123 penetrating from an outer wall 124 of the shank 12 to the inner wall 121 thereof is formed on the shank 12 for facilitating the hole 123 to be communicated with the channel 122. The product is operated by fitting the shank 12 into a pipe a, connecting the channel 122 to an interior of the pipe a via the hole 123, and then fastening the threads 13 into another pipe b for allowing the channel 122 to be communicated with the pipe b. Whereby, the pipes a,b are jointed together through the pipeline fastener 1 for providing a fluid (not shown) to be sequentially conveyed from the pipe a, the hole 123, and the channel 122 to another pipe b.

Consulting FIG. 3, a production of the pipeline fastener 1 necessitates a punching procedure, that is to say, a hole is punched from the outer wall 124 of the shank 12 to the inner wall 121 thereof. During the punching procedure, burrs 2 are formed on a periphery of the hole 123, in other words, the burrs 2 which are not cleaned up are easily left on sections where the inner wall 121 and the outer wall 124 meet a surface 1231 of the hole 123 respectively. Generally, the burrs 2 are metal chips with high hardness and sharpness. If the burrs 2 fall and flow with the fluid in time of use, the pipes a,b or pumps are most probably damaged. To avoid the aforesaid drawback, a burr-cleaning procedure is necessary to be executed after the punching procedure of the pipeline fastener 1 is finished. The burrs 2 on the outer wall 124 can be removed with ease; however, processing works to remove the burrs 2 on the inner wall 121 are very complicated. In general, a cutting tool (not shown) is adopted to remove the burrs, which is operated by introducing the tool from the channel 122 into an inside of the shank 12 for cutting the burrs 2 at a convergence of the inner wall 121 and the surface 1231. Nevertheless, the above operation cannot remove the burrs 2 completely because the burrs 2 are not absolutely cut off and some of them still suspend on the inner wall 121 or are bent into the hole 123 while the cutting tool is inserted to contact to the burrs 2. Consequently, the conventional operation has a poor burr-removal effect. Moreover, some manufacturers adopt a method of using a high temperature generated while explosive substances explode and burn to melt the burrs 2 away for making sure the quality of the pipeline fastener 1. This aforesaid method has a preferable effect of removing the burrs but needs more processing procedures and requires much time and more production cost, which needs to be improved.

SUMMARY OF THE INVENTION

The purpose of the present invention is to provide a pipeline fastener which certainly prevents the burrs from being generated, thereby lowering the production cost and enhancing the safety of the use.

The pipeline fastener in accordance with the present invention comprises a screw head, a shank, and a plurality of threaded units. A channel is enclosed by an inner wall defined inside the shank, and one end of the shank opposite to the screw head is communicated with an outside. At least one hole enclosed by a bore surface is formed on the shank, the bore surface is jointed to a chip-removing surface, and a chip-removing section is enclosed by the chip-removing surface. Whereby, the chip-removing section is defined between the channel and the hole, a diameter of the chip-removing section being bigger than a bore diameter of the hole. Accordingly, by the chip-removing section with the bigger diameter, burrs which are originally apt to be formed at a conventional convergence between the inner wall and a periphery of the hole can be removed effectively. Therefore, following burr-cleansing procedures are reduced to lower the production cost, and damages of the fallen burrs to other objects at the time of using the pipeline fastener are further prevented, thereby promoting the safety of the use efficiently.

Preferably, the chip-removing surface is further connected between the bore surface and the outer wall, whereby the chip-removing section enclosed by the chip-removing surface is also formed between the hole and the outside, the diameter of the chip-removing section which is set between the hole and the outside being also bigger than the bore diameter of the hole.

Preferably, the chip-removing section is formed into an inward-recessed shape or a structure having a width mouth and a gradual narrow neck.

The advantages of the present invention over the known prior arts are more apparent to those of ordinary skilled in the art upon reading following descriptions in junction with the drawings.

BRIEF DESCRIPTION OF THE DRAWINGS

FIG. 2 is a schematic view showing an embodiment of FIG. 1 in use;

FIG. 3 is a partial enlarged view of FIG. 2;

DETAILED DESCRIPTION OF THE PREFERRED EMBODIMENTS

Figure 1:
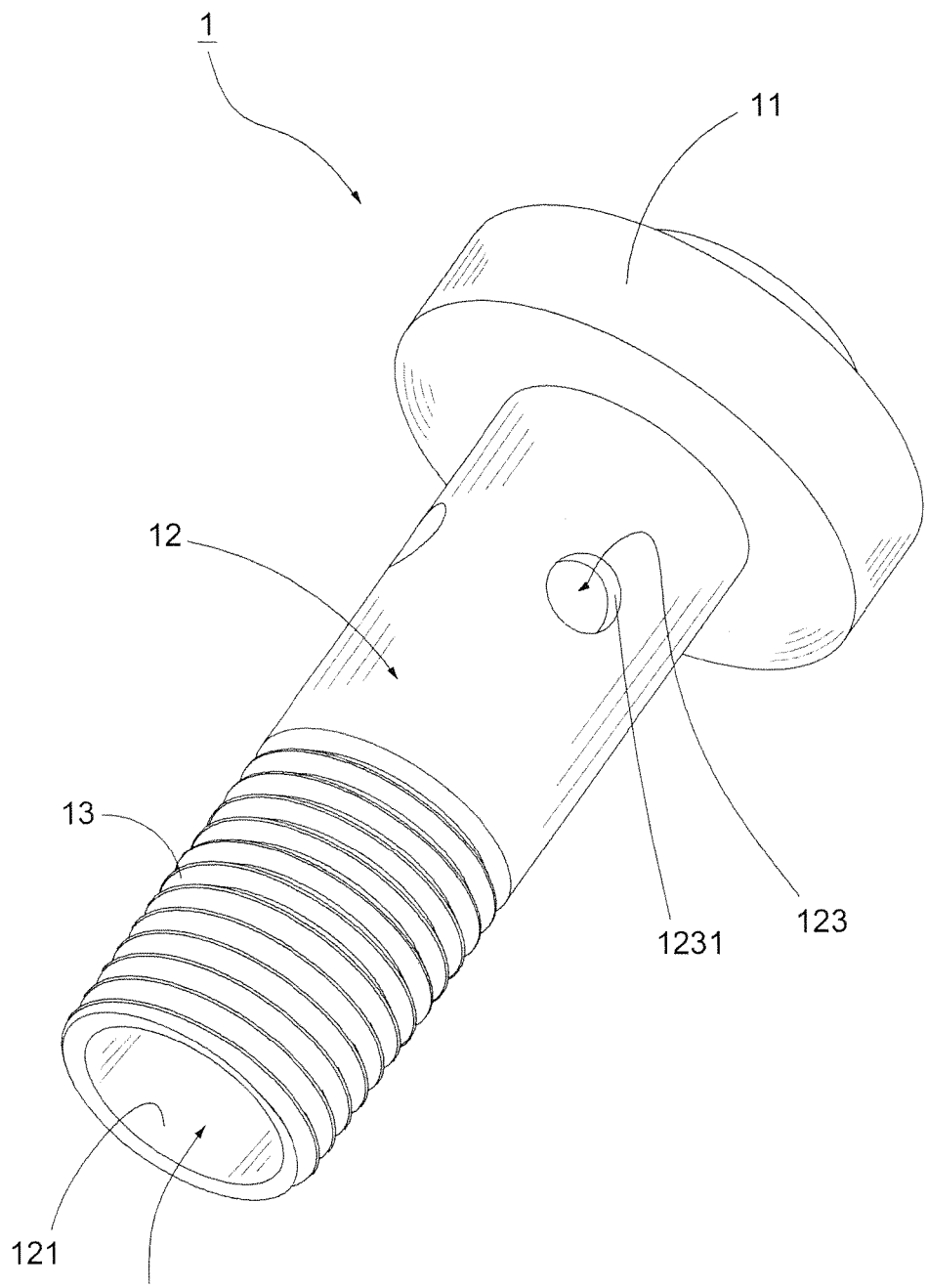
FIG. 1 is a perspective view showing a conventional pipeline fastener.
Figure 4:
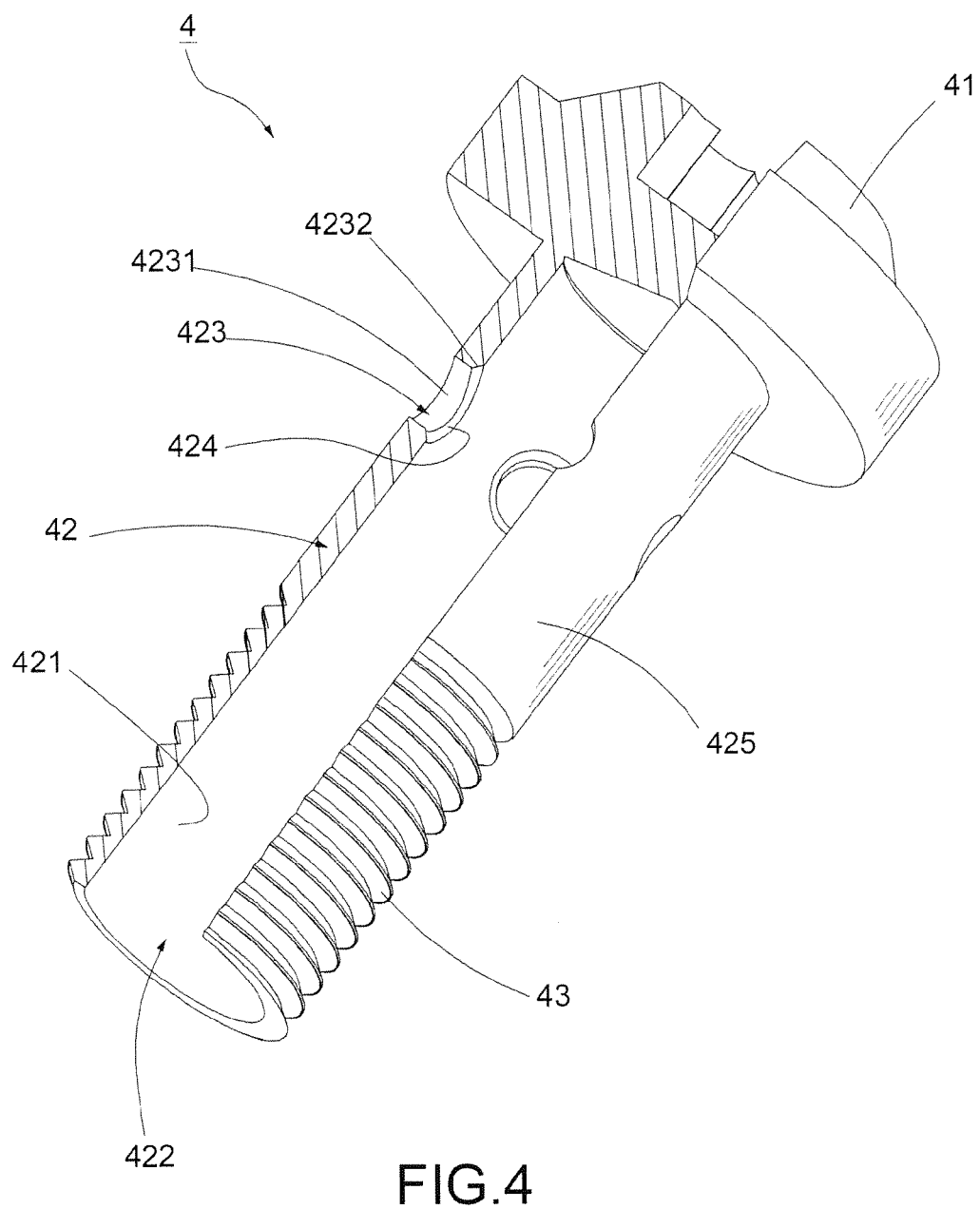
FIG. 4 is a perspective cross-sectional view showing a pipeline fastener of the present invention.
Figure 5:
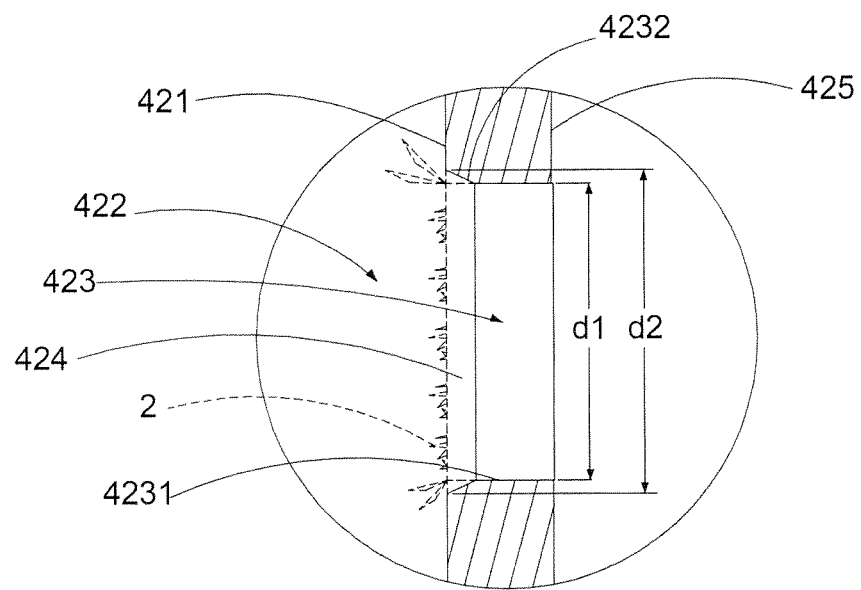
FIG. 5 is a partial schematic view showing a first preferred embodiment of the present invention.
Figure 6:
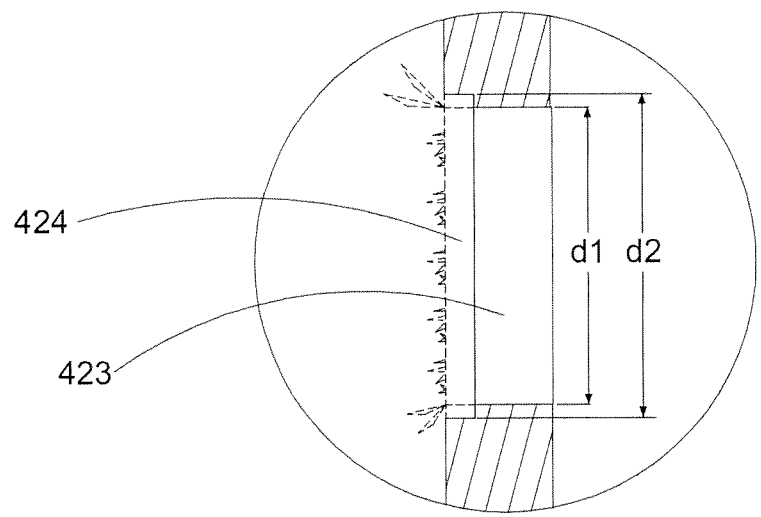
FIG. 6 is a partial schematic view showing a second preferred embodiment of the present invention.

Accompanying with FIG. 4 and FIG. 5, a first preferred embodiment of the pipeline fastener 4 is shown. The pipeline fastener 4 comprises a screw head 41, a hollow shank 42 outwardly extended from the screw head 41, and a plurality of threaded units 43 spirally disposed on the shank 42. Wherein, the shank 42 contains an outer wall 425 in contact with an outside, a channel 422 being enclosed by an inner wall 421 defined inside the shank 42. One end of the channel 422 opposite to the screw head 41 is communicated with the outside. As a result, that end inside the shank 42 is formed into an open state, and the other end thereof is blocked by the screw head 41. At least one hole 423 enclosed by a bore surface 4231 is formed on the shank 42, the bore surface 4231 is connected to a chip-removing surface 4232 which is jointed to the inner wall 421, and a chip-removing section 424 is enclosed by the chip-removing surface 4232. Whereby, the chip-removing section 424 is formed between the channel 422 and the hole 423, a diameter d2 of the chip-removing section 424 being bigger than a bore diameter d1 of the hole 423. The chip-removing section 424 is formed without limitations. In this embodiment, the chip-removing section 424 can be a structure having a width mouth and a gradual narrow neck as shown in FIG. 5. Alternatively, as FIG. 6 shown, the chip-removing section 424 can also be formed into an inward-recessed shape. Herein, FIG. 5 is taken as an example in the preferred embodiments of the present invention.

Referring to FIG. 4 and FIG. 5, after a formation of basic parts of the pipeline fastener 4 including the screw head 41, the shank 42, and the threaded units 43, the channel 422 and the hole 423 are formed in sequence. A tool (not shown) is applied to fit into the hole 423 and cutting at a convergence between the bore surface 4231 and the inner wall 421 for forming the chip-removing surface 4232. The chip-removing section 424 is enclosed by the chip-removing surface 4232, the diameter d2 of the chip-removing section 424 is bigger than the bore diameter d1 of the hole 423. Therefore, during a formation procedure of the chip-removing section 424, burrs 2 which should be originally generated on a periphery of the hole 423 are removed, namely the conventional burrs 2 as shown in dotted lines of FIG. 5 can be directly removed in the present invention. As a consequence, the burrs 2 are not left on the inner wall 421, and following procedures to clean the burrs 2 are also saved, thereby reducing the production cost of the pipeline fastener 4.

Figure 7:
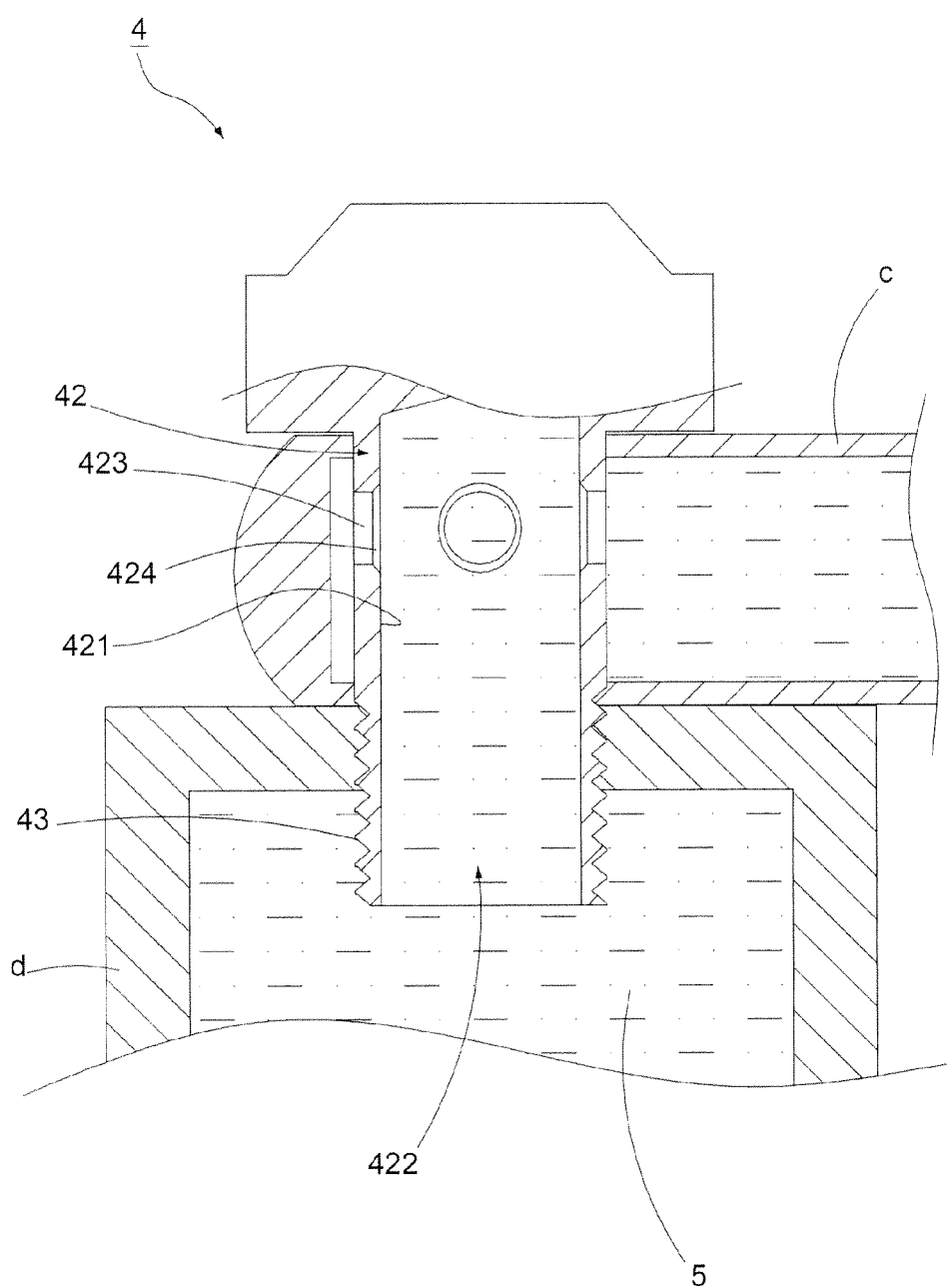
FIG. 7 is a schematic view showing the first preferred embodiment of the present invention in use.

Consulting FIG. 7, while the pipeline fastener 4 is applied to connect pipes c,d, at first, the shank 42 is introduced into the pipe c for facilitating the channel 422 to be jointed to an interior of the pipe c via the hole 423, and then the threaded units 43 are fastened into another pipe d for allowing the channel 422 to be communicated with an interior of the pipe d. Therefore, the pipe c and the pipe dare intercommunicated through the pipeline fastener 4 for providing a fluid 5 to be conveyed from the pipe c, the hole 423, the channel 422, and thence into another pipe din sequence. Simultaneously, the chip-removing section 424 prevents the burrs 2 (not shown) from being left on the inner wall 421. From the above design, the present invention can prevent the problem that burrs 2 not severed in the conventional art fall off by a flowing force of the fluid 5 and flow in the fluid 5, whereby damages of the fallen burrs to the pipes c,d and pumps are avoided and the safety of the use is enhanced.

Figure 8:
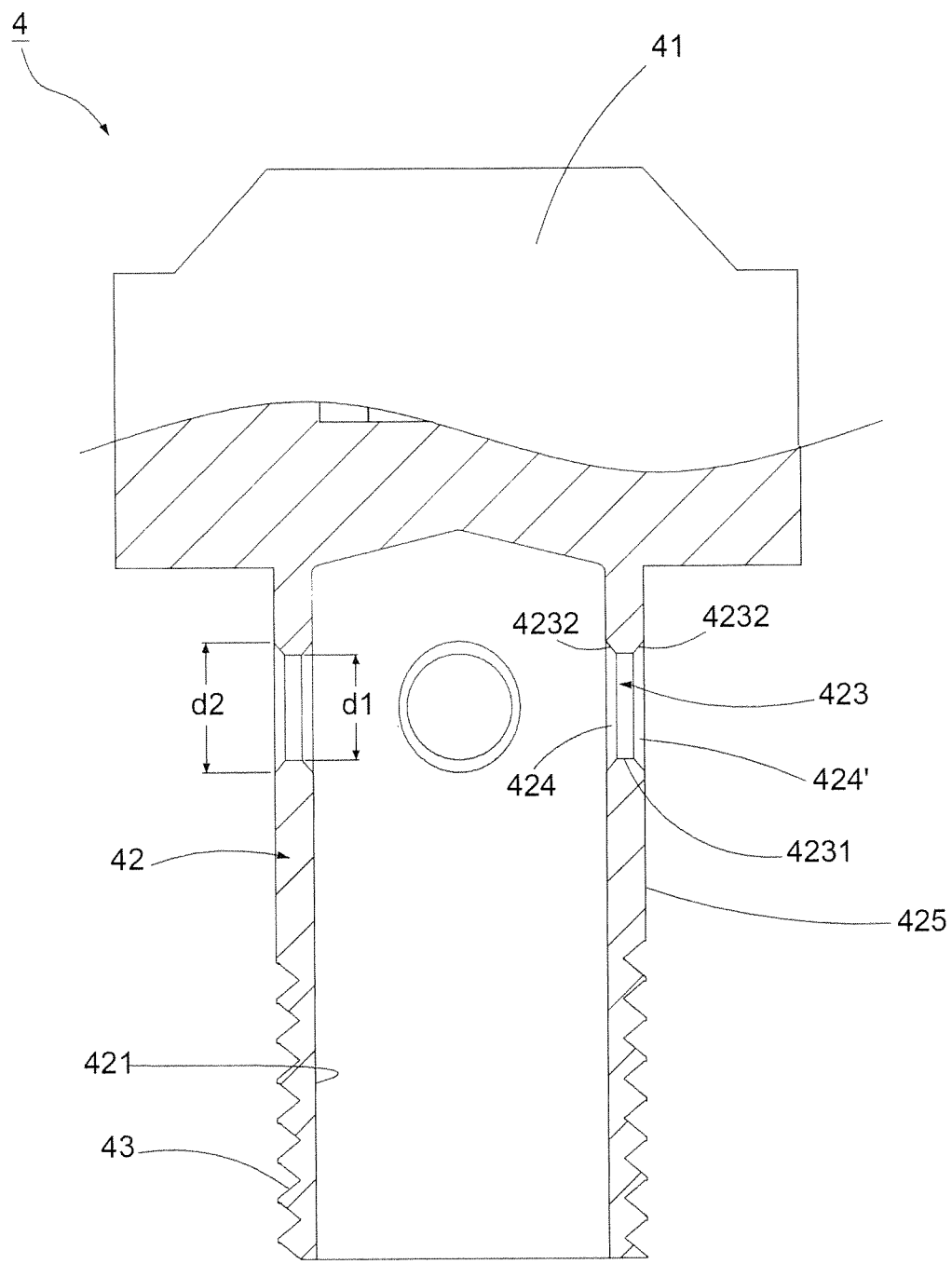
FIG. 8 is a schematic view showing a third preferred embodiment of the present invention.

Referring to FIG. 8, a third preferred embodiment of the present invention is shown. The pipeline fastener 4 still comprises a screw head 41, a shank 42, and a plurality of threaded units 43, the detailed components and structure thereof are the same as the first preferred embodiment, which herein are omitted. Particularly, in this embodiment, the chip-removing surface 4232 is further connected between the bore surface 4231 and the outer wall 425, whereby a chip-removing section 424' enclosed by the chip-removing surface 4232 can be also defined between the hole 423 and the outside, a diameter d2' of the chip-removing section 424' being bigger than the bore diameter d1 of the hole 423. As a result, the present invention prevents the burrs from being generated on the inner wall 421 of the shank 42. At the same time, the burrs (not shown) which should be originally left on the outer wall 425 and on the periphery of the hole 423 are directly removed via the formation of the chip-removing section 424' connected to the outer wall 425, whereby the production cost of the pipeline fastener 4 is reduced.

To sum up, the present invention of the pipeline fastener mainly uses a chip-removing section formed between the inner wall of the shank and each hole, or two chip-removing sections formed between the inner wall and the outer wall of the shank and each hole respectively. Moreover, the diameter of the chip-removing section is bigger than the bore diameter of the hole. Whereby, the burrs on the periphery of the hole can be absolutely removed. The following burr-cleaning procedures are saved to lower the production cost. Further, the damages of the fallen burrs flowing with the fluid to other objects in time of use are also avoided, thereby enhancing the safety of the use and achieving the purpose of the present invention.

While we have shown and described the embodiment in accordance with the present invention, it should be clear to those skilled in the art that further embodiments may be made without departing from the scope of the present invention.

What is claimed is:

1. A pipeline fastener comprising a screw head, a hollow shank outwardly extended from said screw head, and a plurality of threaded units spirally disposed on said shank, wherein said shank includes an outer wall in contact with an outside, a channel being enclosed by an inner wall defined inside said shank, one end of said channel opposite to said screw head being communicated with said outside, at least one hole enclosed by a bore surface being formed on said shank;
   wherein said bore surface of said hole is connected to a chip-removing surface which is jointed to said inner wall, a chip-removing section being enclosed by said chip-removing surface, whereby said chip-removing section is defined between said channel and said hole, a diameter of said chip-removing section being bigger than a bore diameter of said hole.

2. The pipeline fastener as claimed in claim 1, wherein said chip-removing surface is further connected between said bore surface and said outer wall, whereby said chip-removing section enclosed by said chip-removing surface is also formed between said hole and said outside, said diameter of said chip-removing section which is set between said hole and said outside being also bigger than said bore diameter of said hole.

3. The pipeline fastener as claimed in claim 2, wherein said chip-removing section is formed into an inward-recessed shape.

4. The pipeline fastener as claimed in claim 2, wherein said chip-removing section is formed into a structure having a width mouth and a gradual narrow neck.

5. The pipeline fastener as claimed in claim 1, wherein said chip-removing section is formed into an inward-recessed shape.

6. The pipeline fastener as claimed in claim 1, wherein said chip-removing section is formed into a structure having a width mouth and a gradual narrow neck.

* * * * *